(12) United States Patent
Pav et al.

(10) Patent No.: US 8,964,395 B2
(45) Date of Patent: Feb. 24, 2015

(54) SYSTEM AND METHOD FOR MANAGING COOLING AIRFLOW FOR A MULTIPROCESSOR INFORMATION HANDLING SYSTEM

(71) Applicant: Dell Products L.P., Round Rock, TX (US)

(72) Inventors: Darren B. Pav, Round Rock, TX (US); David McKinney, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/171,980

(22) Filed: Feb. 4, 2014

(65) Prior Publication Data

US 2014/0139995 A1 May 22, 2014

Related U.S. Application Data

(63) Continuation of application No. 11/533,399, filed on Sep. 20, 2006, now Pat. No. 8,675,365.

(51) Int. Cl.
*H05K 7/20* (2006.01)
*G06F 1/20* (2006.01)

(52) U.S. Cl.
CPC . *G06F 1/206* (2013.01); *G06F 1/20* (2013.01)
USPC .......... 361/720; 361/695; 361/710; 361/760; 257/712; 165/80.2; 165/122

(58) Field of Classification Search
USPC ...................... 361/679.46–679.54, 688–697, 361/701–704, 707, 709–722, 752, 756, 760
See application file for complete search history.

(56) References Cited

U.S. PATENT DOCUMENTS

| | | | |
|---|---|---|---|
| 6,154,368 A | 11/2000 | Scofield | |
| 6,377,459 B1 | 4/2002 | Gonsalves et al. | |
| 6,462,948 B1 | 10/2002 | Leija et al. | |
| D478,878 S | 8/2003 | Frank et al. | |
| 6,678,157 B1 * | 1/2004 | Bestwick | 361/695 |
| 6,721,180 B2 | 4/2004 | Le et al. | |
| 6,818,371 B2 | 11/2004 | Iga et al. | |
| 6,822,863 B1 * | 11/2004 | Artman et al. | 361/695 |
| 6,930,882 B2 | 8/2005 | Broder et al. | |
| 7,002,797 B1 | 2/2006 | Wittig | |
| 7,342,786 B2 * | 3/2008 | Malone et al. | 361/695 |
| 7,397,660 B2 | 7/2008 | Strmiska et al. | |
| 7,403,387 B2 * | 7/2008 | Pav et al. | 361/694 |
| 7,474,528 B1 * | 1/2009 | Olesiewicz et al. | 361/695 |
| 2003/0043546 A1 * | 3/2003 | Novotny et al. | 361/699 |
| 2005/0122703 A1 * | 6/2005 | Fan et al. | 361/801 |
| 2005/0219813 A1 * | 10/2005 | Cravens et al. | 361/690 |
| 2006/0120039 A1 | 6/2006 | Yuval | |
| 2007/0035923 A1 * | 2/2007 | Beall et al. | 361/687 |
| 2008/0062642 A1 | 3/2008 | Figuerado | |
| 2008/0068789 A1 * | 3/2008 | Pav et al. | 361/687 |

* cited by examiner

*Primary Examiner* — Courtney Smith
(74) *Attorney, Agent, or Firm* — Terrile, Cannatti, Chambers & Holland, LLP; Robert W. Holland

(57) ABSTRACT

Cooling airflow through an information handling system is redirected at positions of a motherboard having an unpopulated processing component towards positions of the motherboard having processing components. For example, a shroud shaped as a nozzle couples to a heat sink connector of the motherboard to cover an unpopulated CPU socket. The shroud has a nozzle-shaped channel with an inlet accepting cooling airflow and an outlet exhausting the cooling airflow towards a processing component. For instance, the inlet is proximate a cooling fan and the outlet directs the airflow from the cooling fan towards a heat sink associated with RAM populated on the motherboard.

16 Claims, 4 Drawing Sheets

SYSTEM AND METHOD FOR MANAGING COOLING AIRFLOW FOR A MULTIPROCESSOR INFORMATION HANDLING SYSTEM

BACKGROUND OF THE INVENTION

1. Field of the Invention

The present invention relates in general to the field of information handling system cooling, and more particularly to a system and method for managing cooling airflow for a multiprocessor information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system performance has improved over time with improvements in the speed and performance of the many processing components typically used to build information handling systems. Perhaps the most prominent improvements center about the exponential growth of the processing power of central processing units (CPUs), which are typically considered the "brain" of an information handling system. CPU processing power increases as more transistors and other features are squeezed into a given area. CPU processing power also increase with increased rates at which computations are performed. In addition to these improvements to CPU processing power, other processing components have contributed to more powerful information handling systems. For instance, double data rate (DDR) random access memory (RAM) stores and accesses greater amounts of information with less footprint and reduced times; graphics cards perform intense computations to provide more crisp and timely image presentations; and hard disk drives rotate fixed storage media at greater rates for more rapid storage response.

One disadvantage to the improvements in information handling system processing components is that greater amounts of heat are typically generated as a byproduct of the operation of these more powerful components. Thermal cooling presents a substantial design problem that varies based on a number of factors, such as the type of components in a system, the size of the system chassis and the number and power of cooling fans included in the system. Cost and acoustic constraints typically drive the arrangement of processing components within the chassis relative to the cooling fan. Often, the CPU is placed proximate the cooling fan since the CPU typically generates more heat than other components. Other components that generate considerable heat, such as RAM, are sometimes aligned to receive cooling airflow after the CPU. Generally, each component is coupled to the system motherboard and then covered by a heat sink that helps to draw heat away from the component. The heat sink typically extends into the cooling airflow and is formed with ridges that expose increased surface area to the cooling airflow. If an information handling system is built without a component, such as with a single CPU in a motherboard that has two CPU sockets, a simulated heat sink is sometimes inserted at the missing component's position so that the airflow through the system chassis remains as designed. Although simulated heat sinks retain the designed cooling airflow, the effectiveness of the cooling airflow is somewhat diminished.

SUMMARY OF THE INVENTION

Therefore a need has arisen for a system and method which manages cooling airflow for information handling systems having missing components.

In accordance with the present invention, a system and method are provided which substantially reduce the disadvantages and problems associated with previous methods and systems for managing cooling airflow to an information handling system. A shroud having an attachment footprint of a heat sink couples to a motherboard over a connector that is unpopulated by a processing component. The shroud has a channel that redirects cooling airflow from a cooling fan to the unpopulated processing component so that improved cooling is provided to another processing component.

More specifically, an information handling system has a motherboard disposed in a chassis, the motherboard operable to support plural processing components, such as multiple CPUs. One CPU socket is populated with a CPU that is covered by a heat sink. The other CPU socket is not populated by a CPU. A shroud couples to the motherboard over the unpopulated CPU socket, such as by coupling to heat sink attachment points associated with the unpopulated CPU socket. An inlet of the shroud accepts cooling airflow directed towards the CPU socket. A channel in the shroud directs the cooling airflow from the inlet to an exhaust that provides the cooling airflow to another processing component, such as RAM coupled to the motherboard. The shroud channel has a nozzle shape to accelerate the cooling airflow for improved heat transfer to the processing component located at the exhaust.

The present invention provides a number of important technical advantages. One example of an important technical advantage is that cooling airflow is more effectively applied to cool information handling system components where one or more components are not installed. The shroud matches the footprint and coupling used by a heat sink for the missing component for ease of assembly as well as ease of removal if a component is subsequently placed in the position. The shroud redirects airflow over the component to provide more effective cooling to nearby components without substantially altering the designed airflow pattern. By redirecting cooling airflow, more effective heat transfer is provided so that cooling fans run at lower speeds to maintain a given thermal profile, thus reducing acoustic noise.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A shroud positioned over an unpopulated motherboard position in an information handling system provides improved cooling airflow by redirecting the cooling airflow towards a populated motherboard position. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
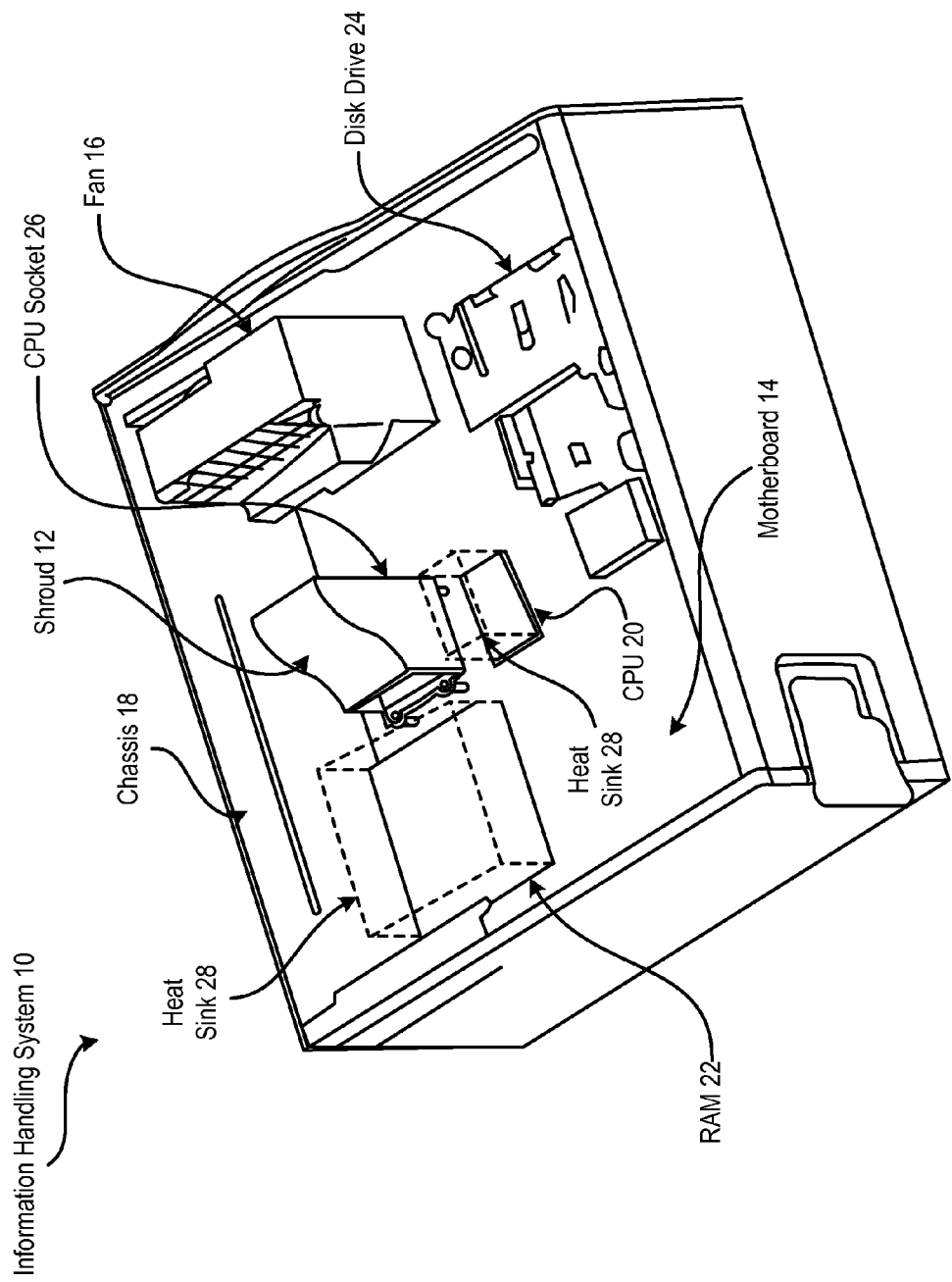
FIG. 1 depicts a rear perspective view of an information handling system having a shroud coupled to a motherboard heat sink connector to redirect cooling airflow from a fan towards a processing component heat sink.

Referring now to FIG. 1, a rear perspective view depicts an information handling system 10 having a shroud 12 coupled to a motherboard 14 heat sink connector to redirect cooling airflow from a fan 16 towards a processing component heat sink. A chassis 18 contains motherboard 14, which has a plurality of connectors to couple with processing components for processing information, such as a CPU 20, RAM 22, a disk drive 24 and various daughter cards, such as a graphics card. The processing components cooperate by communication through motherboard 14 to process information. During operation of information handling system 10, the processing components produce heat as a byproduct. The heat is removed by blowing a cooling airflow from a fan 16 across the processing components to an exit on the back side of information handling system 10. Heat sinks 28, depicted with dotted lines, are placed over the processing components to help draw heat from the processing components and into the cooling airflow. Cooling airflow from fan 16 is directed across one or more processing components with a shroud 12 having a nozzle-shape. Shroud 12 couples to motherboard 14 over the position of a motherboard connector that is not populated by a processing component. In the example embodiment depicted by FIG. 1, shroud 12 couples over a CPU socket 26 to redirect cooling airflow towards RAM 22.

Figure 2:
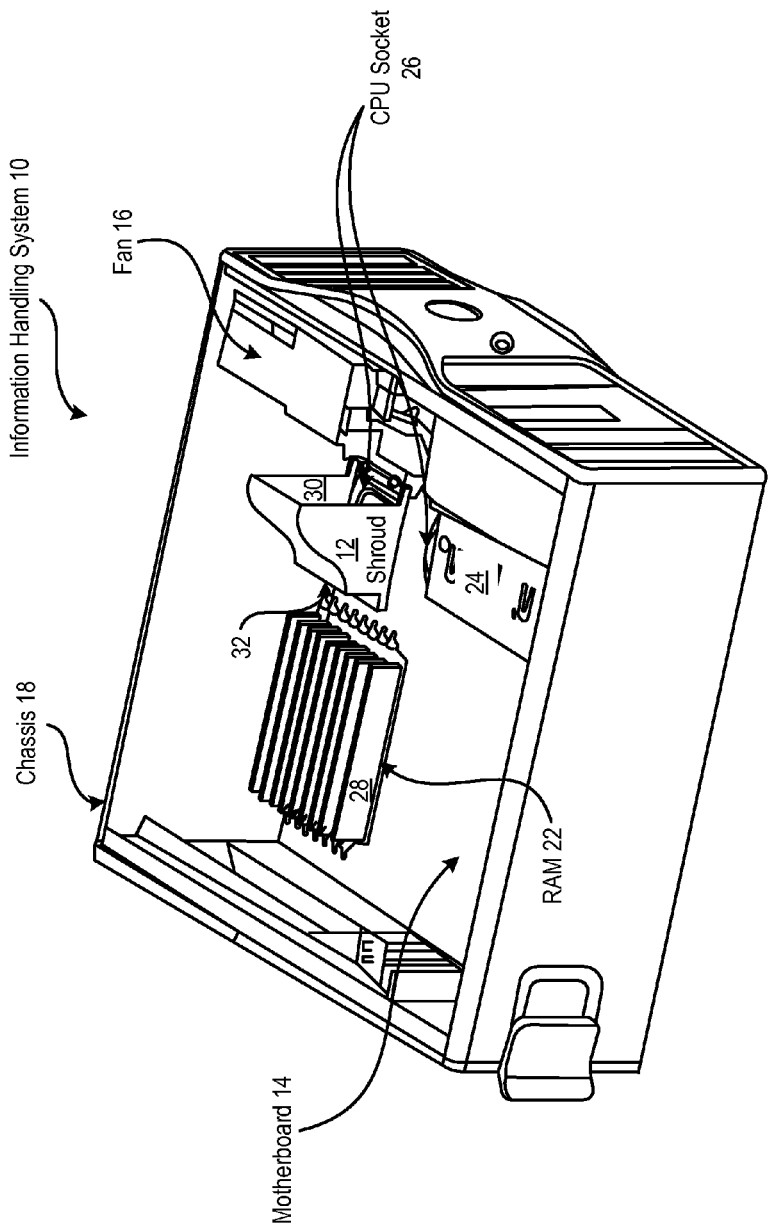
FIG. 2 depicts a front perspective view of an information handling system having a shroud coupled to a motherboard heat sink connector to redirect cooling airflow from a fan towards a processing component heat sink.

Referring now to FIG. 2, a front perspective view depicts an information handling system 10 having a shroud 12 coupled to a motherboard 14 heat sink connector to redirect cooling airflow from a fan 16 towards a processing component heat sink, such as heat sink 28 for RAM 22. Shroud 12 couples over CPU socket connector 26 with a form factor and attachment device of a heat sink 28. An inlet 30 proximate fan 16 accepts cooling airflow and a channel within shroud 12 directs the cooling airflow to an exhaust 32. Exhaust 32 directs the cooling airflow at fins formed in heat sink 28 over RAM 22 to provide improved heat transfer efficiency. Shroud 12 replaces the heat sink that would position over a CPU socket 26 where, in a multi-CPU system, only a single CPU populates motherboard 14. By redirecting airflow from fan 16 with a shroud 12 having a form factor of a heat sink 28, the improvement in heat exchange is provided with minimal disruption to the designed airflow.

Figure 3:
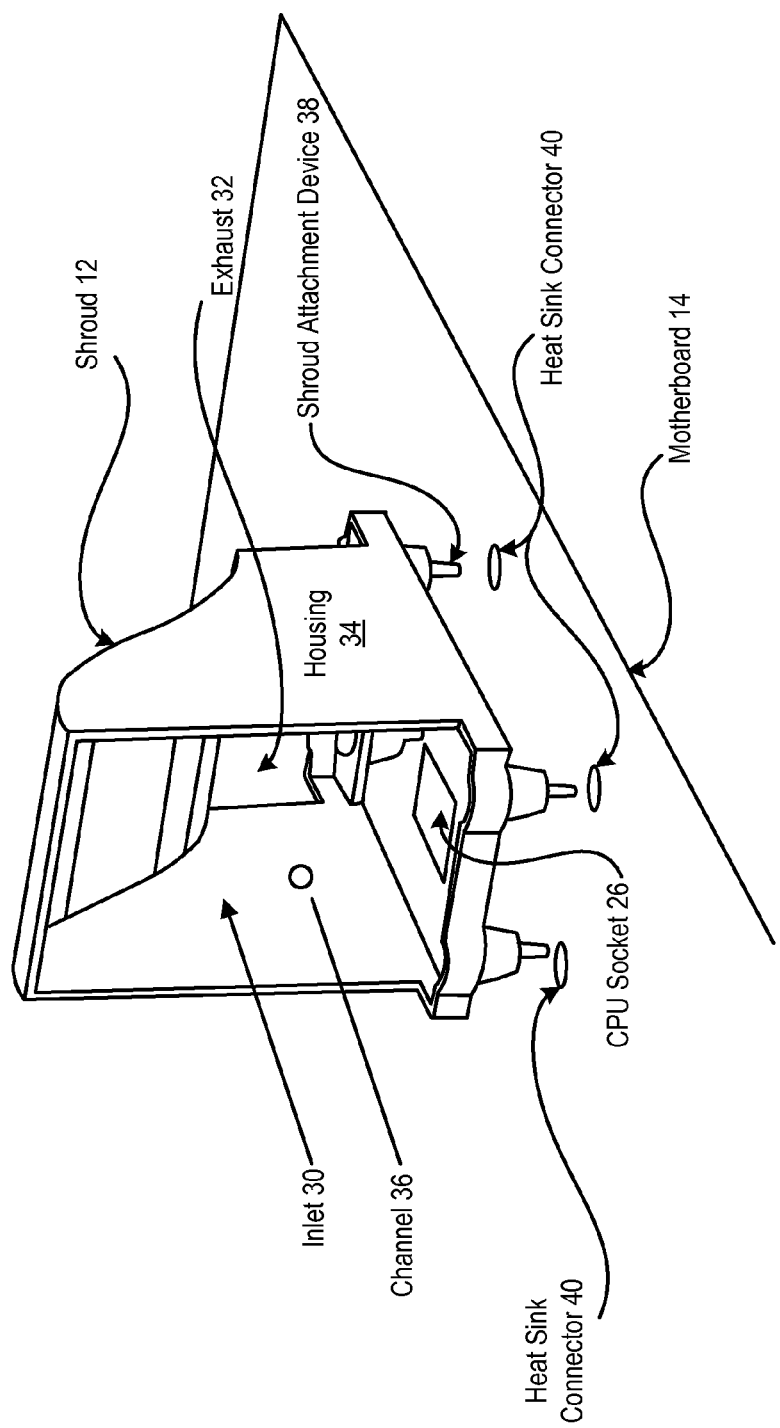
FIG. 3 depicts a front perspective view of a shroud that redirects cooling airflow for an information handling system.

Referring now to FIG. 3, a front perspective view depicts a shroud that redirects cooling airflow for an information handling system. Shroud 12 has a housing 34 formed to define a channel 36, such as with a plastic material. An inlet 30 has a surface area substantially similar to that of a heat sink to accept cooling airflow in a manner similar to that designed for the heat sink. Channel 36 focuses the airflow from inlet 30 with a nozzle-like form to exhaust 32, which has a smaller area than inlet 30. The nozzle-shape of channel 36 accelerates cooling airflow at exhaust 32 to provide improved heat exchange for processing components disposed proximate exhaust 32. Shroud 12 has a shroud attachment device 38 that mimics the attachment device of a heat sink so that shroud 12 couples to motherboard 14 with the heat sink connectors 40 present in motherboard 14 to accept the heat sink. Toolless connection of shroud 12 to heat sink connectors 40 provides ease of assembly and ease of replacement if a CPU is subsequently placed in socket 26.

Figure 4:
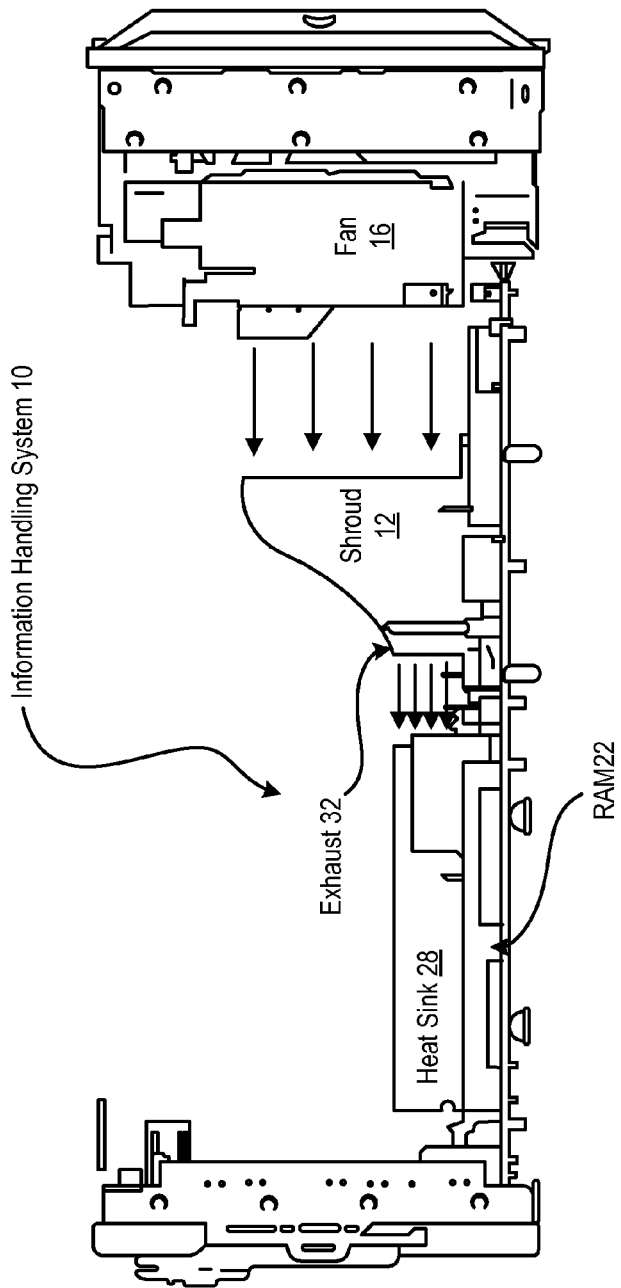
FIG. 4 depicts a side view of an information handling system having a shroud positioned over an unpopulated CPU socket to redirect cooling airflow to substantially the height of a RAM heat sink.

Referring now to FIG. 4, a side view depicts an information handling system 10 having a shroud 12 positioned over an unpopulated CPU socket to redirect cooling airflow to substantially the height of a RAM heat sink 28. The nozzle form of shroud 12 concentrates the cooling airflow at exhaust 32 to provide increased airflow velocity. The momentum of the cooling airflow as it leaves exhaust 32 carries the cooling air to heat sink 28 at substantially the same height as heat sink 28, thus improving cooling airflow through the channels built in heat sink 28. In alternative embodiments, shroud 12 can channel cooling airflow to a variety of processing components, such as a CPU, graphics card or hard disk drive.

Although the present invention has been described in detail, it should be understood that various changes, substitutions, and alterations can be made hereto without departing from the spirit and scope of the invention as defined by the appended claims.

What is claimed is:

1. An information handling system comprising:
   a chassis;
   a motherboard disposed in the chassis, the motherboard having plural processing component connectors operable to accept processing components and heat sink connectors operable to accept heat sinks associated with the processing components;
   plural processing components populating less than all of the processing component connectors, the processing components operable to process information;
   a fan disposed in the chassis and aligned to provide cooling airflow past the processing components; and a shroud positioned over one of the processing component connectors unpopulated by a processing component, the shroud having an exterior outer housing and an interior within the outer housing, the interior forming a channel, the channel having an inlet aligned to accept the cooling airflow into the interior and an outlet aligned to direct the cooling airflow that passes over the unpopulated processing component connector in a predetermined manner.

2. The information handling system of claim 1 wherein the processing component connectors comprise plural CPU connectors and the processing component connector unpopulated by a processing component comprises one of the CPU connectors.

3. The information handling system of claim 2 wherein the shroud opening comprises a funnel shape having a first opening proximate the fan to accept cooling airflow and a second opening proximate a processing component to provide cooling airflow from the fan to the processing component, the first opening larger than the second opening.

4. The information handling system of claim 3 wherein the processing component proximate the second opening comprises RAM.

5. The information handling system of claim 3 wherein the processing component proximate the second opening comprises a CPU.

6. The information handling system of claim 3 wherein the processing component proximate the second opening comprises a hard disk drive.

7. The information handling system of claim 3 further comprising a heat sink disposed over the processing component proximate the second opening, the second opening aligned to direct the cooling airflow substantially over the heat sink.

8. The information handling system of claim 1 wherein the shroud further comprises an attachment device operable to couple to the heat sink connector.

9. A method for managing cooling airflow through an information handling system, the method comprising:
populating less than all of plural circuit board connectors with processing components;
aligning a cooling fan to provide cooling airflow across the connectors; and
covering an unpopulated circuit board connector with a shroud, the shroud having a housing forming a channel, the channel having an inlet to accept cooling airflow into the housing and an outlet to direct cooling airflow that passes over the unpopulated circuit board connector in a predetermined manner out of the housing.

10. The method of claim 9 further comprising:
flowing cooling airflow at the shroud; and
redirecting the cooling airflow with shroud to one or more of the processing components populating the circuit board.

11. The method of claim 10 wherein the redirecting the cooling airflow further comprises:
accepting the cooling airflow at a first opening of the shroud having a first area; and
exhausting the cooling airflow at a second opening of the shroud having a second area, the second area smaller than the first area.

12. The method of claim 10 wherein redirecting the cooling airflow further comprises exhausting the cooling airflow substantially at a heat sink associated with the one or more processing components.

13. The method of claim 9 wherein the unpopulated circuit board connector comprises a CPU socket and a heat sink connector, the method further comprising:
attaching the shroud to the heat sink connector.

14. The method of claim 13 wherein the predetermined manner of directing the cooling airflow comprises:
directing the cooling airflow at a CPU.

15. The method of claim 13 wherein the predetermined manner of directing the cooling airflow comprises:
directing the cooling airflow at RAM.

16. The method of claim 13 wherein the predetermined manner of directing the cooling airflow comprises:
directing the cooling airflow at a hard disk drive.

* * * * *